United States Patent
Gensel

(10) Patent No.: US 6,907,420 B2
(45) Date of Patent: Jun. 14, 2005

(54) PARAMETERIZING SYSTEM AND METHOD

(75) Inventor: Thomas Gensel, Akron, OH (US)

(73) Assignee: Vibren Technologies, Inc., Boxborough, MA (US)

(*) Notice: Subject to any disclaimer, the term of this patent is extended or adjusted under 35 U.S.C. 154(b) by 0 days.

(21) Appl. No.: 10/294,303

(22) Filed: Nov. 14, 2002

(65) Prior Publication Data

US 2004/0098408 A1 May 20, 2004

(51) Int. Cl.[7] .............................................. G06F 17/30
(52) U.S. Cl. ......................... 707/1; 707/100; 707/101; 707/102; 707/103 R; 707/104.1
(58) Field of Search ........................... 707/1, 100, 101, 707/102, 103 R, 104.1; 717/124, 118, 112, 121; 713/1; 358/1.17; 370/352; 345/700

(56) References Cited

U.S. PATENT DOCUMENTS

| | | | |
|---|---|---|---|
| 5,740,338 A | * 4/1998 | Gauthier et al. | ........... 358/1.17 |
| 5,822,565 A | 10/1998 | DeRosa, Jr. et al. | |
| 5,875,327 A | * 2/1999 | Brandt et al. | ................... 713/1 |
| 6,205,446 B1 | * 3/2001 | Mittal et al. | ................ 707/101 |
| 6,226,692 B1 | 5/2001 | Miloushev et al. | |
| 6,321,369 B1 | 11/2001 | Heile et al. | |
| 6,427,228 B1 | 7/2002 | Wigger | |
| 2002/0040469 A1 | * 4/2002 | Pramberger | ................. 717/121 |
| 2002/0085020 A1 | * 7/2002 | Carroll, Jr. | ................... 345/700 |
| 2002/0103994 A1 | * 8/2002 | Morrison et al. | ............... 713/1 |
| 2002/0167935 A1 | * 11/2002 | Nabkel et al. | ............... 370/352 |
| 2003/0200533 A1 | * 10/2003 | Roberts et al. | ............. 717/124 |
| 2003/0221184 A1 | * 11/2003 | Gunjal et al. | ............... 717/118 |
| 2004/0003373 A1 | * 1/2004 | Van De Vanter et al. | ... 717/112 |
| 2004/0003374 A1 | * 1/2004 | Van De Vanter et al. | ... 717/112 |

FOREIGN PATENT DOCUMENTS

GB        2354862 A    *  4/2001    ........... G06F/11/32

OTHER PUBLICATIONS

International Search Report dated Jun. 8, 2004.
"Source Code Instrumentation and Quantification of Events" by Filman, et al., NASA Ames Research Center, pp. 45–49.

* cited by examiner

Primary Examiner—Frantz Coby
(74) Attorney, Agent, or Firm—Calfee, Halter & Griswold LLP

(57) ABSTRACT

A system for intelligently parameterizing and configuring a file is provided. The system includes a parameterizing tool that facilitates identifying items to be parameterized. The parameterizing tool also facilitates creating code (e.g., XML elements and/or attributes) that stores information associated with the parameterized item. The system also includes a configuration tool that facilitates making configuration choices for the parameterized item. The system also includes a merge tool that facilitates creating a configured file based on the original file, the stored information concerning the parameterized item, and the configuration choices for the parameterized item.

24 Claims, 12 Drawing Sheets

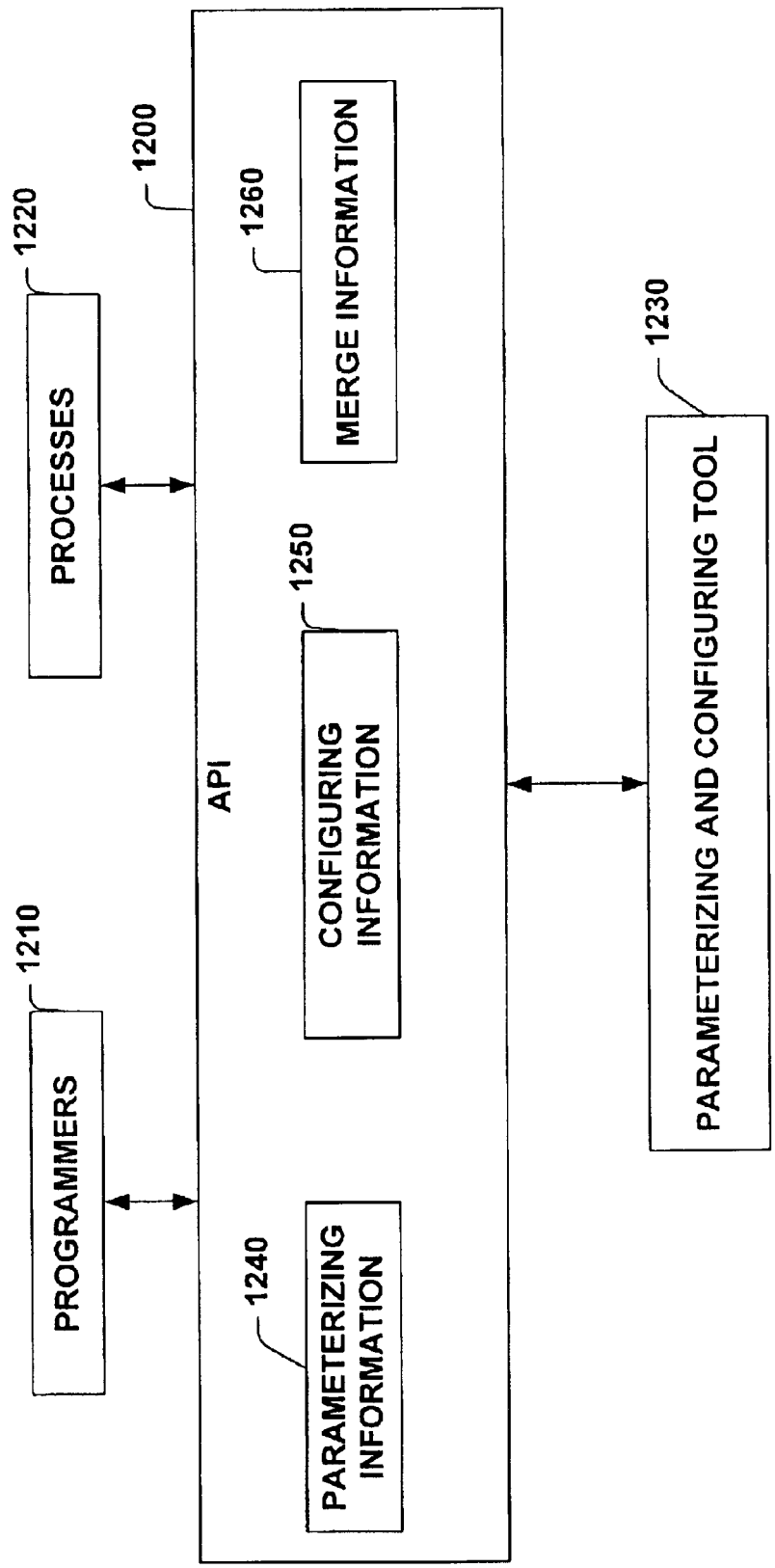

PARAMETERIZING SYSTEM AND METHOD

TECHNICAL FIELD

The systems, methods, application programming interfaces (API), graphical user interfaces (GUI), data packets, carrier waves, and computer readable media described herein relate generally to computer programming and more particularly to designing, storing, and utilizing parameterized, configured files using an extensible markup language (e.g., XML).

BACKGROUND

Some computer related tasks, like software development and systems configuration, include modifying files like text files, data files, source code files, configuration files, and so on. The modifying may be done by a person and/or process who is not the author/creator of the file. When modifying, the modifier may not have and/or understand information concerning the modifications that they are making. Such knowledge, if it exists at all, likely resides in the accumulated expertise of the author/creator and/or a designer. Thus, some modifications may produce unexpected and/or undesired results. Unexpected and/or undesired results are also likely when the modifier is less proficient than the author/creator—if proficient at all—with the syntax, semantics, style, content, and so on of the file being modified. Even careful, complete, and systematic documentation by the author may not prevent such unexpected and/or undesired results.

While modifying a file, a change made by a user may render portions of the remainder of the file damaged, inoperative, and/or meaningless, thereby reducing and/or eliminating the purpose in configuring the affected portion (s). Conversely, a change made by a user may necessitate that other, related changes be made in other portions of the file. While the author/creator may at one point have understood these intertwinings, such relationships may become lost, or, to the end user, may never become known. Even if the relationships are well-documented, the modifier must still read, understand, and heed the directions. Thus, more unexpected and/or undesired results are likely.

Files associated with computer related tasks are typically not static entities. For example, an author/creator may revise their original creation (e.g., adding functionality to a device driver.) End users who wish to benefit from the revisions (e.g. bug fixes) must become aware of the update, evaluate whether it applies to them, understand what was changed, understand how it was changed, be able to effect the changes themselves, and so on. This is frequently a difficult task, if it can be performed at all. The difficulty of the task is complicated by the nature of computer files, where a change in one portion (e.g., data definition) can have ripple effects in other portions.

Conventional attempts to extract, maintain in a transferable form, undo, understand, and so on, changes made in a file include the use of "diff", "delta", and "patch" utilities, for example. Diff and delta utilities facilitate locating differences between files and changes made to files. Patch utilities facilitate taking discovered changes and applying them to other files. While such utilities may simplify finding modifications, conventionally they do not simplify understanding changes, and/or unwinding the changes.

Previous attempts to facilitate end user modification of source files without recoding the source files, or perhaps without even knowing how to recode the source file, have often left the end user with the ability to change a value in a file, but without any insights into what are acceptable values, why they are acceptable, what is recommended and so on. For example, U.S. Pat. No. 6,427,228, entitled Combining A Metadata File and Java Source Code To Dynamically Create Java Classes and JavaBeans, issued Jul. 30, 2002, concerns a technique for combining a metadata file and a Java source code to dynamically create Java classes and JavaBeans. While this increases flexibility by using placeholders for parameters in a main source code file and storing values to be substituted for the placeholders in an auxiliary file (e.g., metadata file), it does not help the author of the original file to convey information and/or control modifications of the original file. Furthermore, it does not guide the editor of the metadata file in understanding the configuration possibilities, or the consequences of configuration choices. Furthermore, attempts like that described in the '228 patent tend to be limited to macro expansions, which reduces the ability to parameterize file contents.

Other attempts to parameterize items (e.g., objects) have focused on supplying data, parameters, and/or values during and/or after item construction (e.g., object instantiation). Such attempts have employed diverse property mechanisms to parameterize component objects in an attempt to provide a uniform mechanism of accessing data. However, the user is often confronted with uninformed choices which, if handled poorly, can have negative impacts on the code, item, object, etc. that they desire to configure. For example, U.S. Pat. No. 6,226,692, entitled Method And System For Constructing Software Components And Systems As Assemblies Of Independent Parts, issued May 1, 2001, concerns assembling software components and systems from independent parts. While the mechanism can be employed for parameterization and serialization of objects, as well as providing structured storage, it leaves the configuring party (e.g., end user) directionless concerning the author/creator design decisions, documentation, guidelines, ranges, and so on.

Other attempts have been made to facilitate making quantified programmatic assertions over programs that otherwise are not annotated to receive assertions. These attempts try to facilitate describing desired behavior in a program without updating the actual program, or even without knowledge of how such an update would be made. For example, aspect oriented programming as described in Source-Code Instrumentation and Quantification of Events, Filman & Havelund, (2002), *In Cytron*, Ron and Leavens, Gary, Eds., *Proceedings Workshop on Foundations Of Aspect-Oriented Languages, AOSD*-2002, Twente, Netherlands., pp 45–49, describe adding event/action pairs to code to simplify customizing the behavior of programs. But, systems that employ, for example, sets of event/action pairs along with programs and/or compilers to analyze and/or process such pairs, may once again present a user with configuration choices without presenting the user with information, guidance, boundaries, recommendations, and so on, as produced by the original code author, that guide the user in making wise or appropriate choices. Thus, unreasoned configuration choices may be made, leading to unanticipated and/or undesired results.

SUMMARY

The following presents a simplified summary of methods, systems, computer readable media and so on for intelligently parameterizing and configuring files, and memorializing such parameterizing and configuring in XML to facilitate providing a basic understanding of these items. This summary is not an extensive overview and is not intended to identify key or critical elements of the methods, systems, computer readable media, and so on or to delineate the scope of these items. This summary provides a conceptual introduction in a simplified form as a prelude to the more detailed description that is presented later.

This application describes example systems, methods, and so on for designing, storing, and using parameterized files using XML. The method facilitates people and/or processes other than an original file author to make, store, track, transfer, unwind, and so on, modifications to a file, where such actions are limited, assisted, guided, and so on, by the author's design. Of course, an original author may also employ the systems, methods, and so on described herein to facilitate configuring parameterized files. Thus, the systems, methods, and so on described herein facilitate a modifier (e.g., end user, internationalizing program, porting program), to modify a file in accordance with an author's designs. Such modifications can be made without the modifier necessarily having to interact with the file contents.

Example systems, methods and so on described herein concern parameterizing a file in a manner that facilitates a modifier (e.g., end user), modifying a file in accordance with an author's designs, thus mitigating problems associated with unanticipated and/or undesired effects due to unreasoned configuration choices. In addition to parameterizing a file, the systems, methods, and so on described herein facilitate associating author design notes and constraints (e.g., commentary, advice, restrictions) with modifiable sections of a file, without altering the original file. Furthermore, the systems, methods, and so on facilitate establishing modification relationships between various portions of a file. For example, if a first change in a file mandates other changes, then such a relationship can be established in an XML file related to the original file. Similarly, if a second change obviates the need to configure another portion of a file, then this type of relationship can also be stored in an XML file related to the original file. Establishing these relationships facilitates guiding a modifier to a relevant file section for modifying.

The application describes a parameterizing tool which may be, for example, a computer component, logic, or software, that converts a computer file (e.g. text, source code, data) into an XML file and facilitates designating sections of the file as configurable parameters. The parameterizing tool also facilitates establishing limits, rules, guidelines and so on concerning acceptable values for configurable parameters. Furthermore, the parameterizing tool facilitates establishing and documenting relationships between configurable parameters. The parameterizing tool may produce, for example, a parameterized file.

The application also describes a configuration tool, which may be, for example, a computer component, software, or logic, that inputs a parameterized file and through an interface (e.g., GUI), interacts with a modifier (e.g., end user) to facilitate establishing values for configurable parameters. The configuration tool may, depending on its own configuration status, for example, guide, hide, limit, and so on, the modifier's visibility into configurable parameters and/or file contents. The configuration tool may produce, for example, a value file in XML.

The application also describes a merge tool that may be, for example, a computer component, software, or logic, for combining a parameterized file with a value file to produce a configured file. The configured file may be, in one example, the same type as the original file (e.g., C in, C out), or it may, in another example, be a different file (e.g. C in, HTML out). The merge tool may perform validation (e.g., range checking, relationship analysis) while merging the files.

Example systems, methods and so on described herein employ extensible markup languages like XML. An extensible markup language (e.g., XML) facilitates producing self-describing data structures with varying depths and complexities. XML documents can contain optional grammar descriptions for use by applications seeking to perform structured validation of XML files. XML facilitates users defining new tags, attributes, attribute names, and so on. Furthermore, XML facilitates nesting document structures to varying levels of complexity. Thus, XML facilitates creating a parameterized file, a value file, and a configured file by facilitating designing, storing, validating, establishing, and utilizing configurable parameters. A helpful examination of XML can be found in, XML IN A NUTSHELL, A Desktop Quick Reference, Harold and Means, O'Reilly & Associates, Inc., 2001, ISBN 0-596-00058-8, which is illustrative of material with which one skilled in the art would be familiar.

Certain illustrative example methods, systems, computer readable media, and so on are described herein in connection with the following description and the annexed drawings. These examples are indicative, however, of but a few of the various ways in which the principles of the methods, systems, computer readable media, and so on may be employed and thus are intended to be inclusive of equivalents. Other advantages and novel features may become apparent from the following detailed description when considered in conjunction with the drawings.

BRIEF DESCRIPTION OF THE DRAWINGS

FIG. 12 illustrates an example API associated with intelligently parameterizing and/or configuring a file.

DETAILED DESCRIPTION

Figure 1:
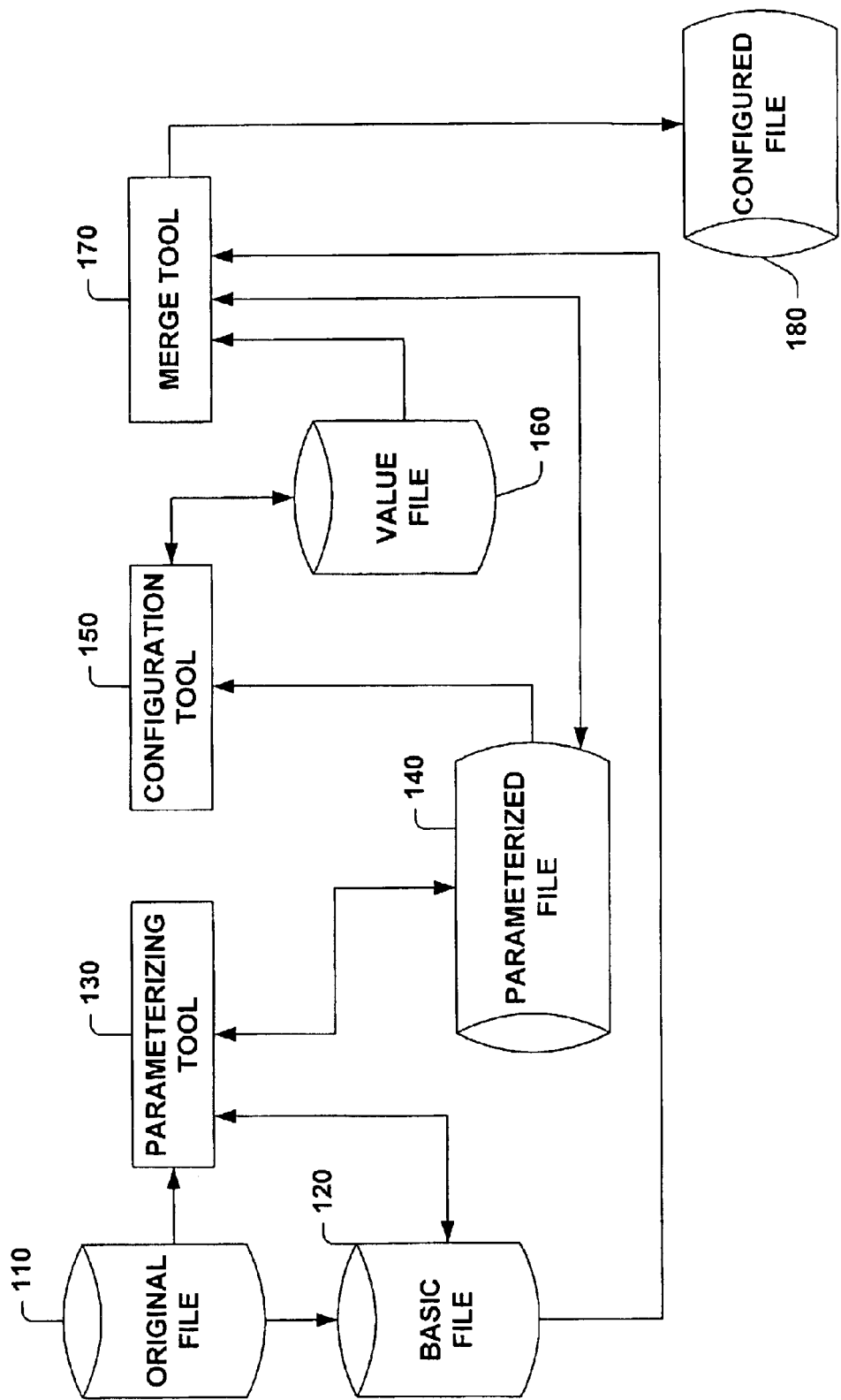
FIG. 1 illustrates an example system for intelligently parameterizing and configuring a file.

Example systems, methods, computer media, and so on are now described with reference to the drawings, where like reference numerals are used to refer to like elements throughout. In the following description, for purposes of explanation, numerous specific details are set forth in order to facilitate thoroughly understanding the methods, systems, computer readable media, and so on. It may be evident, however, that the methods, systems, computer readable media, and so on, can be practiced without these specific details. In other instances, well-known structures and devices are shown in block diagram form in order to simplify description.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program and a computer. By way of illustration, both an application running on a server and the server can be computer components. One or more computer components can reside within a process and/or thread of execution and a computer component can be localized on one computer and/or distributed between two or more computers.

"Computer communications", as used herein, refers to a communication between two or more computers and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic", as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device. Logic may also be fully embodied as software.

An "operable connection" is one in which signals and/or actual communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Signal", as used herein, includes but is not limited to one or more electrical or optical signals, analog or digital, one or more computer instructions, a bit or bit stream, or the like.

"Software", as used herein, includes but is not limited to, one or more computer readable and/or executable instructions that cause a computer or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel, and other manners.

The example systems, methods, and so on described herein concern simplifying the task of an author and simplifying—or even making possible—the task of modifying the author's creation. The author has likely written a software program (e.g. a device driver) that can benefit from being parameterized. Alternatively, the author may have written another type of file (e.g., recipes, compounds, text, data) that could also benefit from being parameterized.

Being intelligently parameterized means, in the context of this application, creating a parameterized item, associating information with the parameterized item so that the value of the item can be configured by a configuring person and/or process in accordance with design decisions, guidelines, and/or rules to mitigate problems associated with unreasoned and/or uninformed configuration choices. The design decisions can include, but are not limited to, a maximum value, a minimum value, a range, a recommended value, configuration relationships, revealing documentation, and so on. Configuring intelligently means that the configurer has guidance, direction, and/or limits placed on the values they choose for a parameter, with, in some examples, commentary available to help in the configuration decision. The types of things that can be intelligently parameterized and/or configured include, but are not limited to, variables, constants, statements, code fragments, text items, data items, and so on. Intelligent configuring also includes, in one example, the ability to unwind a configuration choice (e.g., return a parameter to its value before configuration). Intelligent configuring also includes, in another example, the ability to store a configuration choice so that it can be applied to another file or set of files. Intelligent parameterizing and configuring is facilitated by creating code in an extensible markup language (e.g., XML) that stores parameterizing information, options, and values.

Thus, intelligently parameterizing includes identifying an item (e.g. variable, constant, statement, code fragment, text item, data item) to be parameterized, creating a parameter, and associating information (e.g., name, type, identifier, max, min, range, guidelines, help text, related parameterized entities) with the item. Once the item has been parameterized, the item can be configured. Intelligently configuring the parameterized item includes, but is not limited to, presenting configuration choices, presenting configuration guidelines, counseling a configurer concerning configuration choices, performing range checking, and storing the configuration choices for the parameterized item. The storing is facilitated by creating code (e.g., XML elements and/or attributes) that store the value information and choices.

Referring initially to FIG. 1, a system 100 for intelligently parameterizing and configuring a file is illustrated. The system 100 includes a parameterizing tool 130 that receives an original file 110, a basic file 120, and/or a parameterized file 140. The parameterizing tool 130 can intelligently parameterize items including, but not limited to, variables, constants, statements, code sections, definitions, conditionals, text, data, and so on. The intelligently parameterized file 140, when implemented as an XML file, stores identifiers that identify parameterized items, XML wrapped items from the original file 110, parameterized items, and parameter characteristics related to the parameterized items. The parameter characteristics facilitate making informed choices concerning a parameterized item. For example, a configurer may desire to configure an integer variable with a range of ten, a maximum value of twelve and a minimum value of two. During intelligent parameterizing, the parameterizing tool 130 could identify the variable to be parameterized, create a universally unique identifier (uuid) for the parameter, create XML elements and/or attributes to store the range, maximum and minimum, and help text to guide a configurer. Then, during configuration, the configurer could examine the parameter characteristics, and the rationale behind them, before making a configuration choice. Thus, problems associated with unreasoned configuration choices can be mitigated.

By way of illustration, an original file 110 (e.g. C program) is processed into a basic XML file 120 that stores header information (e.g., identifying information) and encapsulates the "body" of the original file 110. The basic XML file 120 is then input to the parameterizing tool 130, which facilitates the author parameterizing items in the code. The author selects an item to parameterize then builds the list of characteristics of the parameters, acceptable values for the characteristics, descriptions of the characteristics, names of the characteristics, helpful text concerning the characteristics of the parameterized item and so on.

Changes that are made to the original file 110 can be memorialized by updating the basic XML file 120 and/or creating a new XML file, (e.g., a parameterized file 140). The XML files may have, for example, elements and attributes updated to reflect the changes. Also, a uuid is associated with a parameter and its creation. The uuid facilitates locating an item and also facilitates establishing relationships between items. For example, the uuid can be employed as a key for searching for items. Thus, the intelligently parameterized file 140 can include a parameterized item and parameter characteristics related to the parameterized item. The parameter characteristics can include, but are not limited to, a maximum value, a minimum value, a range, a type, a limit, rules for establishing acceptable values, guidelines for establishing acceptable values, recommended values, a uuid, related parameter identifiers, and conditional expression(s) that control whether and/or how a parameterized item can be configured.

The system 100 also includes a configuration tool 150. The configuration tool 150 inputs the intelligently parameterized file 140, and selectively presents choices for configurable parameters. Whether the configurer is presented with a configurable parameter can be controlled, for example, by configuration tool 150 choices, parameterizing tool 130 choices, author choices, end user choices, evaluation of conditions in the parameterized file 140 code, and so on. In one example, the configuration tool 150 employs a GUI to present choices to a configurer.

As the values are set by the configuration tool 150, a value file 160 is created and/or updated. The value file 160 stores the selected values and/or information concerning which parameters have been updated, how they were updated (e.g., which characteristics, what values), and a uuid that facilitates tracking, for example, what changes were made by what people at what time to a parameterized item. The value file 160 can be, for example, an XML file. When the value file 160 is implemented as an XML file, it can include XML elements and/or attributes that store the parameter values and related information.

The system 100 also includes a merge tool 170 that can input, for example, the value file 160, the basic file 120, and/or the original file 110 to produce a configured file 180 ready for subsequent processing (e.g., compiling, interpreting, running, controlling a computer component).

While using the parameterizing tool 130, it can be specified when and/or how a parameterized item will be presented to a configurer for choice making during configuration. For example, a first item may always have to be configured (e.g., adding an enabling product identification code to unlock a software license). Whether a second item has to be configured may depend on whether a certain other item has been configured. A third item may only have to be configured under certain conditions (e.g., number of devices less than X, number of users greater than Y), where the conditions may be established when other items are configured. A fourth item may only have to be configured if the configuration tool 150 is set to a certain level (e.g., beginner, novice, professional, expert, guru). While four situations are described above, it is to be appreciated that a greater and/or lesser number of situations can be established by an author and/or the parameterizing tool 130. Furthermore, whether a parameterized item is presented for configuration by the configuration tool 150 can be based on a conditional expression. The conditional expression can be associated with the item (e.g., bracket the code) to facilitate locating the conditional expression.

As mentioned above, different items can be parameterized. One type of item that can be parameterized is a variable. By way of illustration, the following line of C code declares and initializes a variable.

int k=value_of_k; // declare integer k and assign value of literal value_of_k

The above line of C code might be included in a .c file, for example. Similarly, the following line of C code might be located in a .h file.

define value_of_k 7; // define 7 for literal value_of_k

Conventionally, a compiler would encounter the literal value_of_k in the .c file, look in the .h file, replace value_of_k with 7 and move on to other compilation tasks. Programmers might then change the operation of the .c file by updating the literal in the .h file and recompiling. In isolation, examining the line defining the literal value_of_k provides little, if any, information to an end user trying to configure a system where the configuring includes updating the value for value_of_k.

If a parameterizer wants the #define line to be parameterized, the #define line could be placed in a basic XML file 120. XML elements could then be created that describe how to configure the parameterized item, and that provide samples, guidelines, documentation, rules, relationships and so on associated with the parameterized item. These elements could then be stored in the intelligently parameterized file 140. Then, the configuration tool 150 can process the parameterized file 140 and selectively display choices to a configurer, which choices are memorialized in the XML value file 160 in entities and/or attributes, for example. Ultimately, the value XML file 160 is merged back with other files to create a new .h and/or .c file, which can then be further processed (e.g., compiled). The new .c and/or .h file can be referred to as a configured file 180. While a .c and .h file are described above, it is to be appreciated that the systems, methods, and so on described herein are not limited to C programming language files, and that other programming languages, data representation languages, and other file types (e.g., data, text) can be processed by the example systems and methods described herein. For example, a text file could be internationalized using the systems, methods and so on described herein.

By way of further illustration, the following line of C code defines a literal in a .c file whose definition can be found in a related .h file:

code_fragment1; // literal for a code fragment

The following lines of C code provide the definition for the literal define code_fragment1

```
            {
                instruction₁;
                instruction₂;
                . . .
                instruction₃;
            }
```

The parameterizing tool 130 can be employed to select the code_fragment as an item to be parameterized. For example, a GUI can be employed to highlight and identify a section of a file. Artificial intelligence (e.g. pattern matching, neural network) can then be employed to categorize the item as, for example, code, text, data, and so on, to facilitate suggesting parameterizing characteristics. Thus, the #define line from the original .h file can be encapsulated in a basic XML file 120. Using the parameterizing tool 130, the author can describe how the item can be configured. For example, configuration choices including, but not limited to, instructions/guidance/commenting for configuring, order of instructions, type of instructions, range of instructions, number of instructions, result types for instructions, conditional (in)exclusion, and so on can be specified. Entities and/or attributes in an XML file record these parameterized item characteristics. Thus, employing the configuration tool 150, a configurer can make reasoned value choices concerning the characteristics, which value choices are then stored in an XML value file 160. Ultimately, the value file 160 can be merged back and a configured file 180 is created.

The parameterizing tool 130 facilitates creating parameters. One aspect of creating parameters as described herein is assigning a uuid to the parameterized item. The uuid facilitates tracking and resolving changes made to an original file 110 and/or by a configurer as configuration choices. The configuration tool 150 can guide a configurer through the process of reconciling values desired by the configurer with recommended/required values. The reconciling is facilitated by pairing uuids assigned to the parameters.

A configurer (e.g. end user) makes choices, and the configuration tool 150 creates/updates an entry in a value file 160. In one example, for a configuration choice for a parameterized item, the configuration tool 150 adds a child element to a parent element and establishes a value for the child element. Additionally, the configuration tool 150 associates a uuid with the child element and value. The uuid facilitates identifying facts like, when a parameterized item was configured, by whom it was configured, its previous value, and the like. While three facts are described in relation to the uuid, it is to be appreciated that a greater and/or lesser number of facts can be associated with the uuid.

Figure 2:
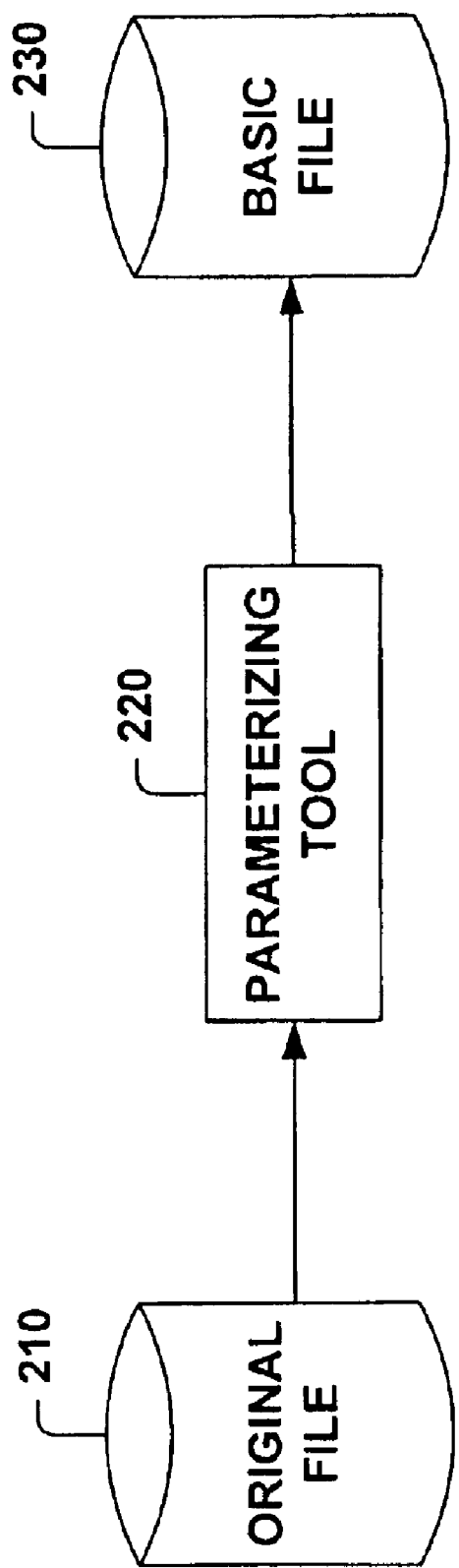
FIG. 2 illustrates an example parameterizing tool.

Turning now to FIG. 2, a parameterizing tool 220 is illustrated inputting an original file 210 and outputting a basic file 130. The parameterizing tool 220 processes the body of the original file 210 into the basic file 130 by, for example, wrapping the body of the original file 210 in semantic and/or syntactical components of an extensible markup language (e.g., XML). In one example, the parameterizing tool 220 adds basic identifying information (e.g., author name, author identifier, file name, file location, file size, file protections, settings for parameterizing tool 220, settings for configuration tool) to the basic file 230 to facilitate later merging a value file with the original file 210 and/or the basic file 230.

In another example, the parameterizing tool 220 adds information to the basic file 230 concerning resolving external file references which again facilitates later merging.

---

By way of illustration, an original C file:
```
#define voi 7;
main( )
{
    int i voi;
    int j;
    j = i;
}
```
may be processed by the parameterizing tool 220 into:
```
<header>
    <header_param₁> . . . </header_param₁>
    <header_paramₙ> . . . </header_paramₙ>
</header>
<body>
    #define voi 7;
    main( )
    {
        int i voi;
        int j;
        j = i;
    }
</body>
```

---

While the above description illustrates one possible wrappering and translation to XML, it is to be appreciated that other wrapperings and translations can be employed in accordance with the systems, methods, and so on described herein.

Figure 3:
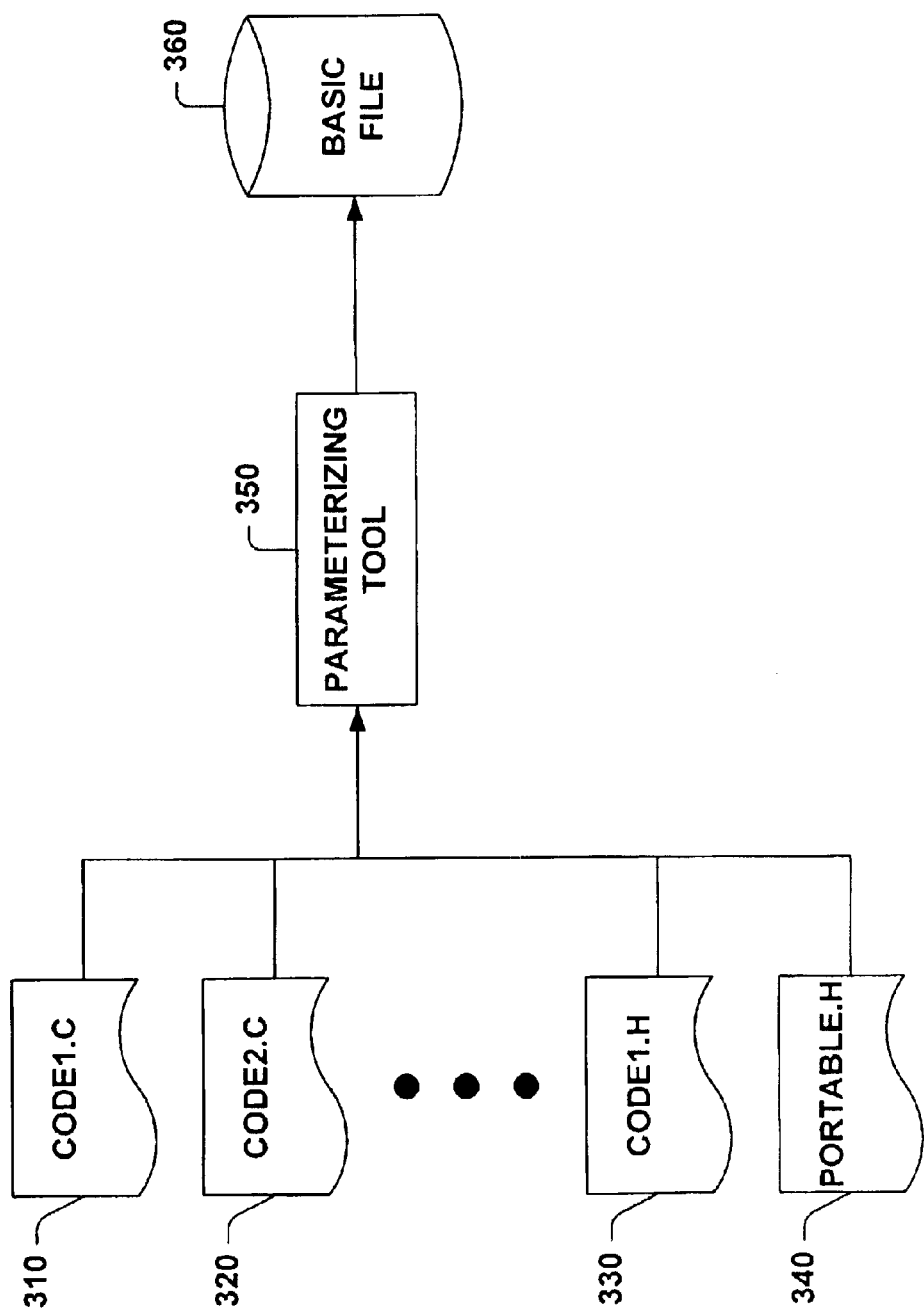
FIG. 3 illustrates an example parameterizing tool.

FIG. 3 illustrates a parameterizing tool 350 receiving several files (e.g. C file 310, and C file 320 through h file 330, h file 340) and producing a basic file 360. In software development, it is common to have several such files associated with a project. Thus, the parameterizing tool 350 can parameterize more than one file. In one example, the parameterizing tool 350 can resolve external file references and determine what effects, if any, parameterizing an item in one file will have on other files. While one basic file 360 is illustrated, in one example, the parameterizing tool 350 can produce more than one basic file. Furthermore, the parameterizing tool 350 can create one or more parameterized files related to the files it receives.

FIG. 3 also illustrates a file 340 portable.h. The file 340 can be employed in projects to store items that are thought to be likely candidates for parameterizing. Thus, in one example, the parameterizing tool 350 may identify items to be parameterized items, may establish relationships to other code sections in other files (e.g., 310 through 330) and create a basic file 360 that stores the original code for the items to be parameterized and the relationships.

Figure 4:
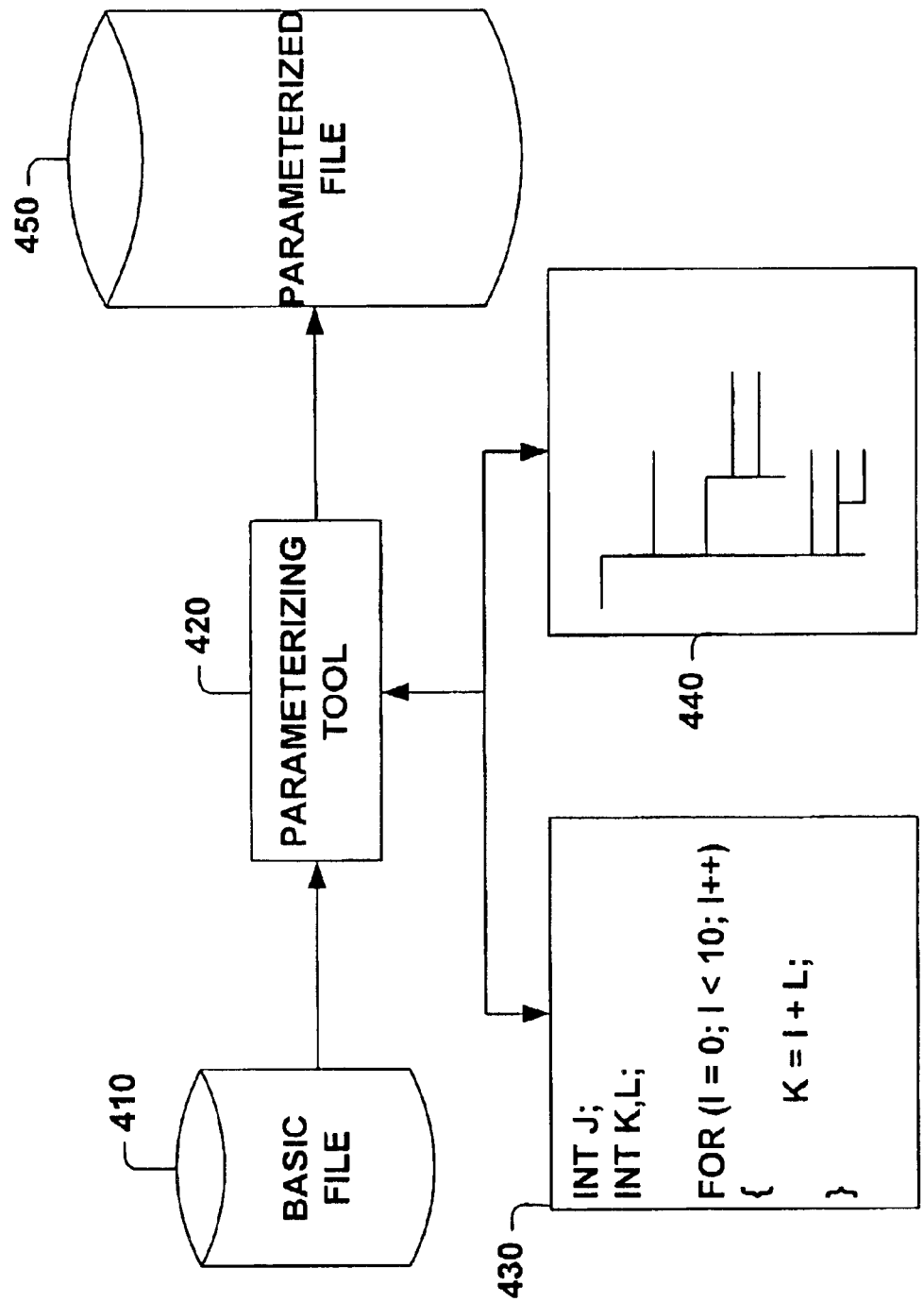
FIG. 4 illustrates an example parameterizing tool.

Turning now to FIG. 4, a parameterizing tool 420 accepting a basic file 410 and producing an intelligently parameterized file 450 is illustrated. The parameterizing tool 420 may employ a GUI that facilitates locating and/or selecting items to parameterize. The GUI may also facilitate visualizing parameterizing choices. Thus, one example GUI window 430 can display, for example, code sections in the basic file 410. Similarly, another example GUI window 440 can display, for example, a tree of parameter characteristics that can be selected for a parameter. By way of illustration, if the integer j, as declared in the line:

Int j;

displayed in window 430, were selected for parameterizing, then the window 440 could display a tree of parameter characteristic choices for an integer (e.g., name, type, range, maximum, minimum, length, precision, set of valid choices, guidelines, documentation, relationships with other parameterized items). In this way, a parameterizer (e.g., designer, programmer) can be prodded and/or required to record information about the parameterized item, which facilitates later conifgurers making informed, reasoned configuration choices, thus mitigating unanticipated and/or unexpected results. Additionally and/or alternatively, the parameterizing tool 420 could display a menu to facilitate parameterizing choices. Thus, in one example, in a computer system having a graphical user interface with a display and a selection device, the parameterizing tool 420 may employ a method of providing and selecting from a set of data entries on the display. The method may include retrieving a set of data entries that represent a set of parameterization choices for a portion of a file and displaying the set of entries on the display. The method may also include receiving a data entry selection signal indicative of the selection device selecting a selected data entry and, in response to the data entry selection signal, initiating an operation associated with the selected data entry.

Figure 5:
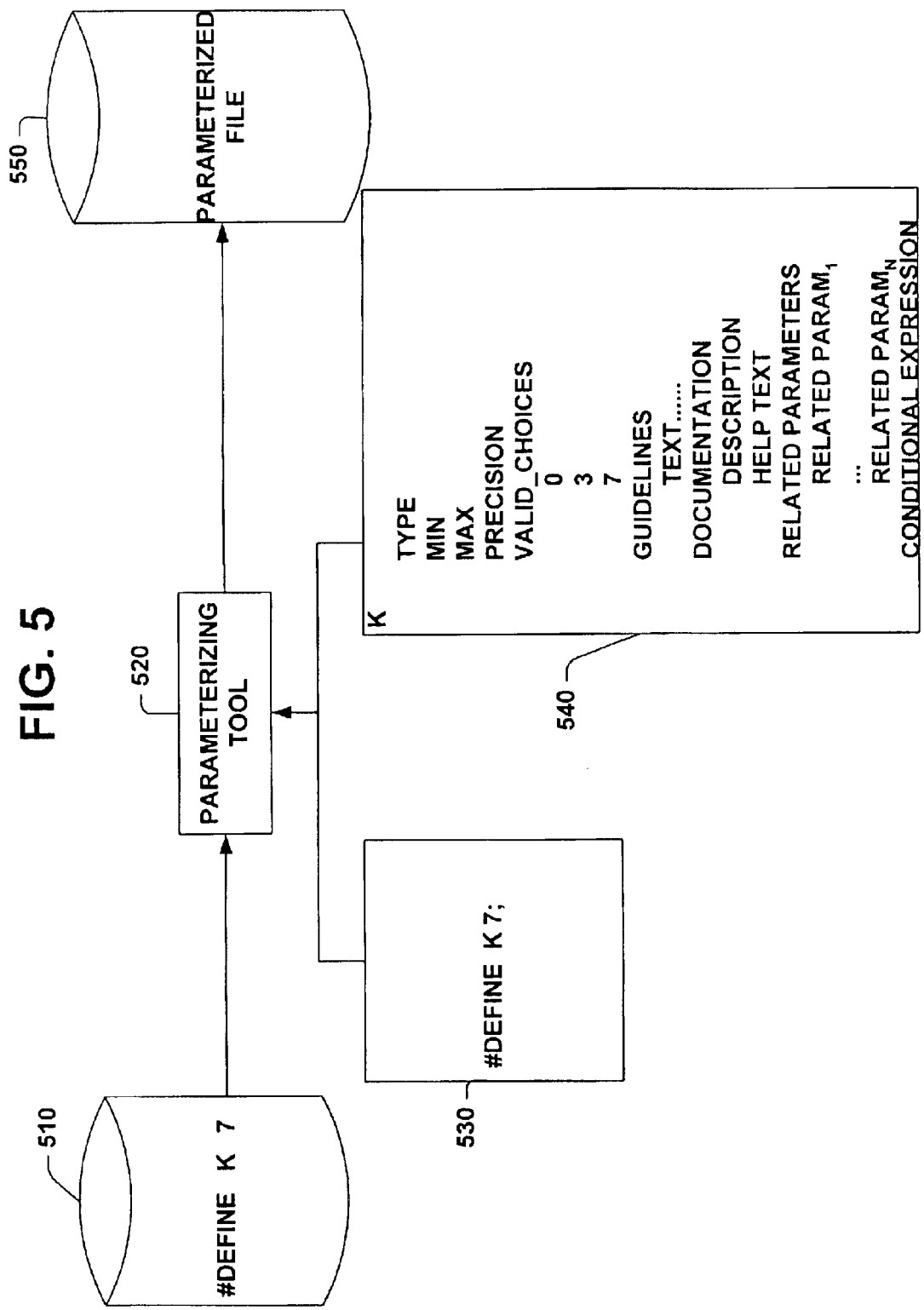
FIG. 5 illustrates an example parameterizing tool.

FIG. 5 illustrates a parameterizing tool 520 producing an intelligently parameterized file 550. The parameterizing tool 520 may be employed to parameterize an item selected from a basic file 510. For example, an integer k may be associated with the C statement:

define k 7

The parameterizing tool 520 may employ a GUI window 530 to display the item, which facilitates identifying an item to parameterize. Artificial intelligence can analyze a selected item (e.g., line of code) to categorize the item and suggest possible parameter characteristic sets. Thus a parameterizer can be lead and/or required to choose and complete a set of parameter characteristics. Similarly, the parameterizing tool 520 may employ a GUI window 540 to display parameterizing choices for the item. Thus, parameter characteristics for an integer may be displayed. While eight parameterizing choices are illustrated in window 540, it is to be appreciated that a greater and/or lesser number of choices can be employed. Furthermore, a configurer may create parameter characteristics not seen in window 540 and/or may choose some, none, or all of the parameter characteristics. After the processing of the parameterizing tool 520, the intelligently parameterized file 550 may hold XML code storing elements and/or attributes related to a parameterized item. By way of illustration, the file 550 could hold:

```
<param name='k' init_val='7'>
    <type>integer</type>
    <min>0</min>
    <max>7</max>
    <valid_choice>0</valid choice>
    <valid_choice>3</valid choice>
    <valid_choice>7</valid choice>
    <documentation>
        <description>sample text abc</description>
        <help_text>more sample text abc</help_text>
    </documentation>
    <related_params>
        <rp name='rp1'></rp>
        <rp name='rp2'></rp>
    </related_params>
</param>
```

Concerning the related parameters listed in the parameter characteristics, the parameterizing tool 520 can search the basic file 510 and/or other file(s) in a software project to locate references to the item being parameterized. Then, depending, for example, on setup choices, the parameterizing tool 520 can selectively present these found references to query for whether they should be related to the item being parameterized. Similarly, depending, for example, on setup choices, the parameterizing tool 520 may selectively present other parameterized(able) items to the user for a decision on whether they should be related.

Concerning the conditional expression listed in the parameter characteristics, the parameterizing tool 520 can define a region/item that has a conditional associated with it. If, for example, the conditional evaluates to TRUE, a configurer will be presented with the item to configure. Conditionals can have qualifiers that specify whether an item is required, recommended, optional, to be hidden, and so on. In one example, a parameterized file 550

```
<conditional>
    <expression='disk>3'></expression>
    <code>
        <line>#ifSCSI</line>
        <line>#define k 7</line>
        <line>#endif</line>
    </code>
</conditional>
```

While one example XML segment is described, it is to be appreciated that other XML translations and collections of entities and/or attributes can be employed with the systems and methods described herein.

Figure 6:
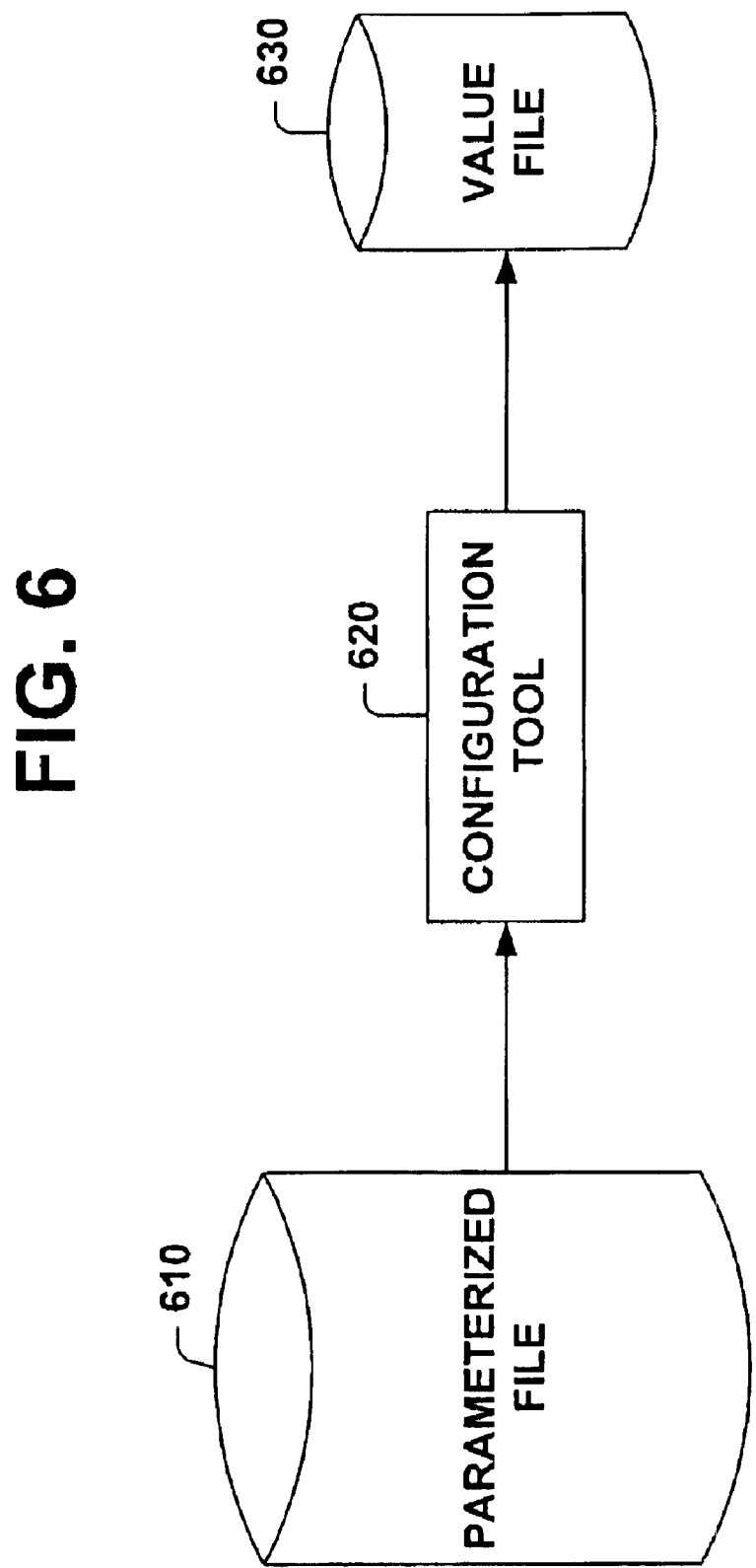
FIG. 6 illustrates an example configuration tool.

Turning now to FIG. 6, a configuration tool 620 is illustrated receiving an intelligently parameterized file 610 and producing a value file 630. In one example, the configuration tool 620 inputs parameters and/or parameter characteristics from the file 610 and selectively presents configuration choices to a configurer. For example, the configuration tool 620 may employ a GUI to display the parameters and/or configuration choices. Therefore, a configurer can be lead through and/or required to complete certain configuration choices only after being presented with parameter characteristic information like valid choices, recommended choices, and/or textual descriptions of the parameter and the effects of configuring it in a certain way. This facilitates making informed configuration choices and thus mitigating unexpected and/or unanticipated results. In one example, in a computer system having a graphical user interface with a display and a selection device, the configuration tool 620 may employ a method of providing and selecting from a set of data entries on the display. The method may include retrieving a set of data entries that represent a set of configuration choices for a portion of a file (e.g., an item) and displaying the set of entries on the display. The method may also include receiving a data entry selection signal indicative of the selection device selecting a selected data entry and, in response to the data entry selection signal, initiating an operation associated with the selected data entry. Furthermore, the configuration tool 620 facilitates validating configuration choices and storing such validated choices in the value file 630.

The following two XML code samples illustrate code entries before and after configuration, where values and uuids are associated with attributes.

```
Before;
<parameter_x>
    <attribute_1></attribute_1>
    <attribute_2></attribute_2>
    ...         ...
    <attribute_n></attribute_n>
</parameter_x>
After:
    <parameter_x>
    <attribute_1>value uuid_1</attribute_1>
    <attribute_2>value uuid_2</attribute_2>
    ...         ...
    <attribute_n>value uuid_n</attribute_n>
</parameter_x>
One skilled in the art can readily envision how an XML entry like:
    <parameter_x>
    <attribute_1>value uuid_1</attribute_1>
    <attribute_2>value uuid_2</attribute_2>
    ...         ...
    <attribute_n>value uuid_n</attribute_n>
</parameter_x>
could be mapped to a code section like
object parameter_x
{
    int attribute_1 = value;
    float attribute_2 = value;
    ...
    char attribute_n = value;
}
``` with uuids being employed as an index into a database table that tracks changes associated with parameterized items. Thus, rather than employ conventional techniques like diff and patch utilities, parameterized item configurations, changes, and so on can be tracked using the uuid and various data processing techniques (e.g., database retrieval, file processing, list processing, stack processing).

Figure 7:
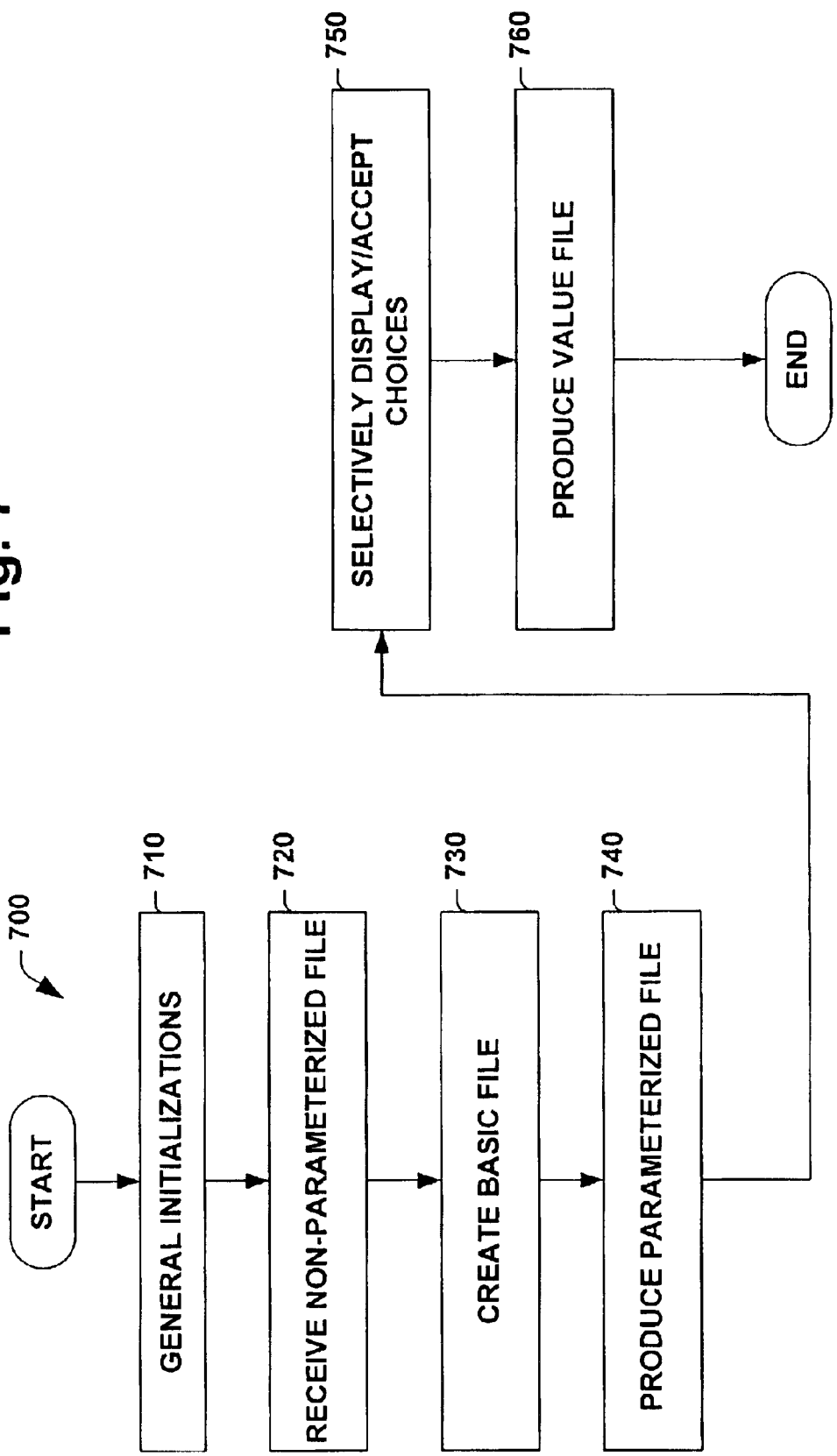
FIG. 7 is a flow chart illustrating an example method for intelligently parameterizing and configuring a file.
Figure 8:
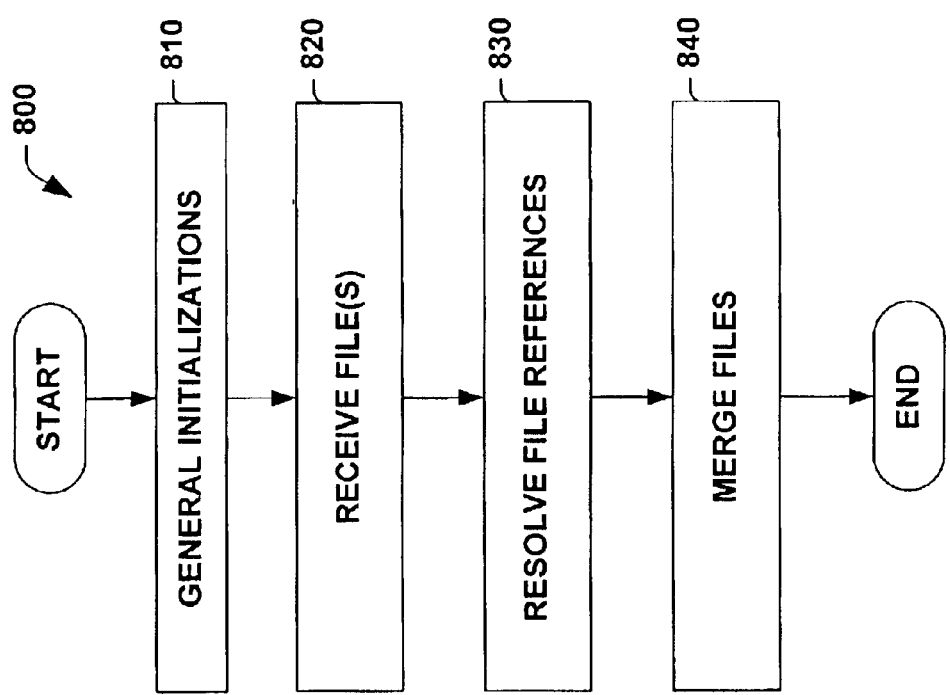
FIG. 8 is a flow chart illustrating an example method for producing a merged file.

In view of the exemplary systems shown and described herein, example methodologies that are implemented will be better appreciated with reference to the flow diagrams of FIGS. 7 and 8. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks. In one example, methodologies are implemented as computer executable instructions and/or operations, stored on computer readable media including, but not limited to an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, rectangular blocks denote "processing blocks" that may be implemented, for example, in software. Similarly, the diamond shaped blocks denote "decision blocks" or "flow control blocks" that may also be implemented, for example, in software. Alternatively, and/or additionally, the processing and decision blocks can be implemented in functionally equivalent circuits like a digital signal processor (DSP), an ASIC, and the like.

A flow diagram does not depict syntax for any particular programming language, methodology, or style (e.g., procedural, object-oriented). Rather, a flow diagram illustrates functional information one skilled in the art may employ to program software, design circuits, and so on. It is to be appreciated that in some examples, program elements like temporary variables, routine loops, and so on are not shown.

FIG. 7 is a flowchart of an example method 700 for intelligently parameterizing and configuring a file. The method 700 includes, at 710, general initializations that may include, for example, establishing communications between computer components, initializing variables, memories, pointers, allocating memory, and so on.

At 720, an original, non-parameterized file is received. The file may include, for example, one or more items that are candidates to be parameterized. The file may be, for example, a text file, a data file, a code file, and the like. At 730, the contents of the original file can be wrapped in components of an extensible markup language (e.g., XML) to produce a basic file. The basic file can include, for example, XML elements and attributes that facilitate identifying the original file and which may also facilitate navigating inside the basic file. The basic file may also include XML elements and/or attributes for storing regions/items from the original file.

At 740, an intelligently parameterized file is produced. This can include identifying items in the basic file to parameterize, creating a parameter for an identified item and storing the parameter in the intelligently parameterized file. Rather than simply storing a placeholder for a parameter, as is conventional, the method includes creating parameter characteristics, associating them with the parameter, and storing them in the intelligently parameterized file. For example, if the parameter is stored as an element in an XML file, then the parameter characteristics could be associated with the parameter by storing them as sub elements, separate related elements, and/or as attributes associated with the parameter element. The association may be made, for example, by uuids.

At 750, parameters and/or parameter characteristics, including reasoning guidelines for configuring choices can be selectively displayed to a configurer. Thus, values for parameters can be established and stored, at 760, in a value file.

In one example, creating a parameter associated with an item to be parameterized includes establishing a name for a parameter, selecting parameter characteristics for the parameter, and selecting configuration options (e.g., do always, do selectively, do conditionally). Creating a parameter can also include, for example, updating XML code in an intelligently parameterized file to store the name, characteristics, options, and so on. In one example, the name, characteristics, options and so on are stored in XML elements and/or attributes.

FIG. 8 is a flowchart of an example method 800 for creating an intelligently configured file. At 810, general initializations occur. This can include, but is not limited to, allocating memory, establishing pointers, and so on. At 820, one or more files are received for merging. The files to merge can include, but are not limited to, a non-parameterized file, a basic file, an intelligently parameterized file, and a value file. At 830, one or more actions like resolving external file references can occur. For example, a first parameter in a first file may have been configured to have its value associated with and/or derived from a second parameter in a second file. Thus, external references in one or more of these parameters may need to be resolved. Furthermore, one file may be related to another file, which requires both files to be located and inspected to facilitate merging. Further still, merging and thus applying a value from a value file to a parameterized item from a basic file may be conditional on an expression evaluating to a certain value. Thus, at 830, such conditionals may be computed and evaluated.

At 840, the files are merged, which includes replacing parameterized items with their configured values to produce an intelligently configured file. Thus, rather than a conventional configuration where values are applied to placeholders or macros are expanded without consideration of intelligent parameterization, here, reasoned choices with guidelines, documentation, validation and unique identifiers can occur.

Figure 9:
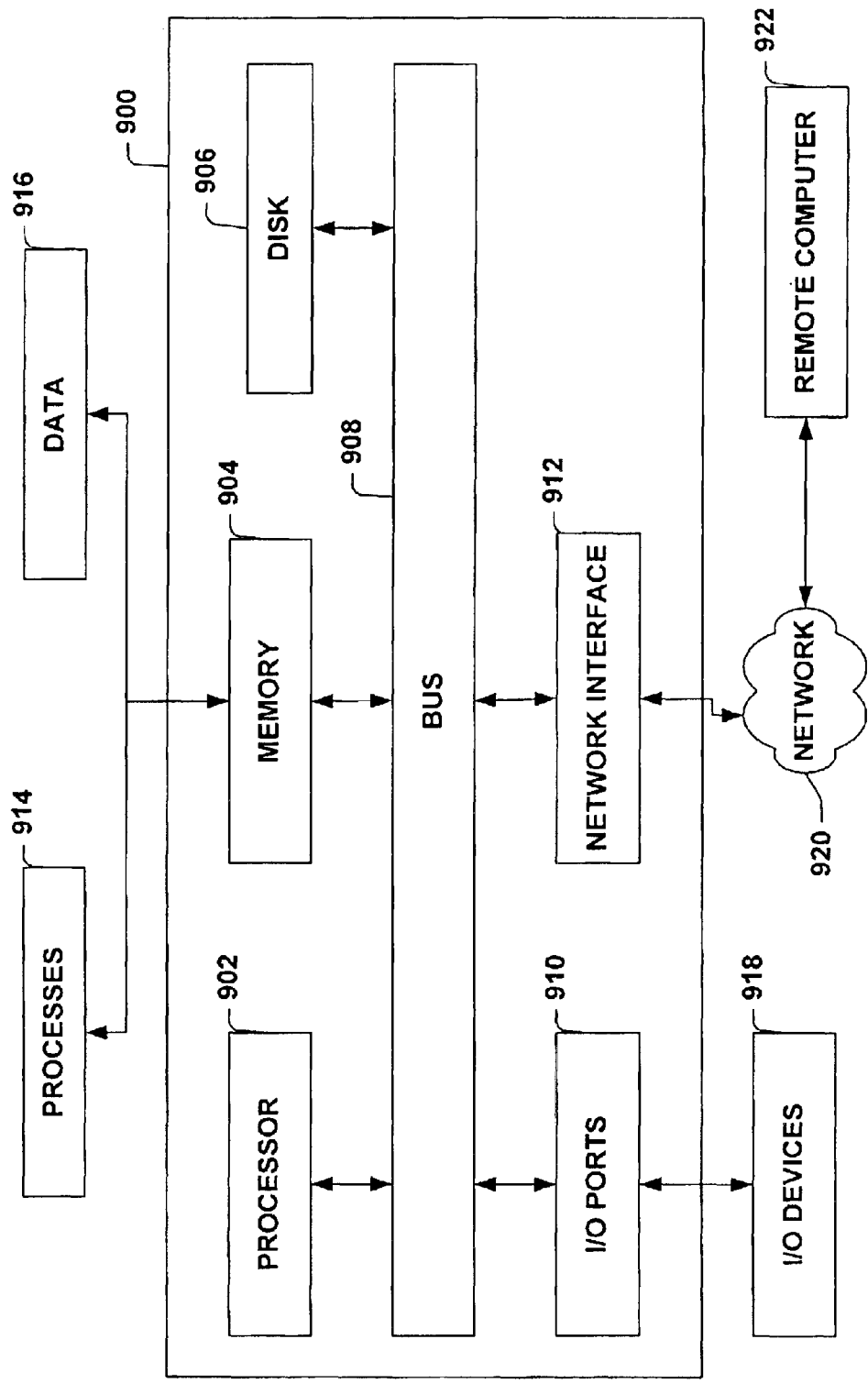
FIG. 9 is a schematic block diagram of an example computing environment with which computer executable system components and/or computer executable instructions of example methods described herein may interact.

FIG. 9 illustrates a computer 900 that includes a processor 902, a memory 904, a disk 906, input/output ports 910, and a network interface 912 operably connected by a bus 908. Executable components of the systems described herein may be located on a computer like computer 900. Similarly, computer executable methods described herein may be performed on a computer like computer 900. It is to be appreciated that other computers may also be employed with the systems and methods described herein. The processor 902 can be a variety of various processors including dual microprocessor and other multi-processor architectures. The memory 904 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 906 can include, but is not limited to, devices like a magnetic disk drive, a floppy disk drive, a tape drive, a Zip drive, a flash memory card, and/or a memory stick. Furthermore, the disk 906 can include optical drives like, compact disk ROM (CD-ROM), a CD recordable drive (CD-R drive), a CD rewriteable drive (CD-RW drive) and/or a digital versatile ROM drive (DVD ROM). The memory 904 can store processes 914 and/or data 916, for example. The disk 906 and/or memory 904 can store an operating system that controls and allocates resources of the computer 900.

The bus 908 can be a single internal bus interconnect architecture and/or other bus architectures. The bus 908 can be of a variety of types including, but not limited to, a memory bus or memory controller, a peripheral bus or external bus, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 900 interacts with input/output devices 918 via input/output ports 910. Input/output devices 918 can include, but are not limited to, a keyboard, a microphone, a pointing and selection device, cameras, video cards, displays, and the like. The input/output ports 910 can include but are not limited to, serial ports, parallel ports, and USB ports.

The computer 900 can operate in a network environment and thus is connected to a network 920 by a network interface 912. Through the network 920, the computer 900 may be logically connected to a remote computer 922. The network 920 can include, but is not limited to, local area networks (LAN), wide area networks (WAN), and other networks. The network interface 912 can connect to local area network technologies including, but not limited to, fiber distributed data interface (FDDI), copper distributed data interface (CDDI), ethernet/IEEE 802.3, token ring/IEEE 802.5, and the like. Similarly, the network interface 912 can connect to wide area network technologies including, but not limited to, point to point/links, and circuit switching networks like integrated services digital networks (ISDN), packet switching networks, and digital subscriber lines (DSL).

Figure 10:
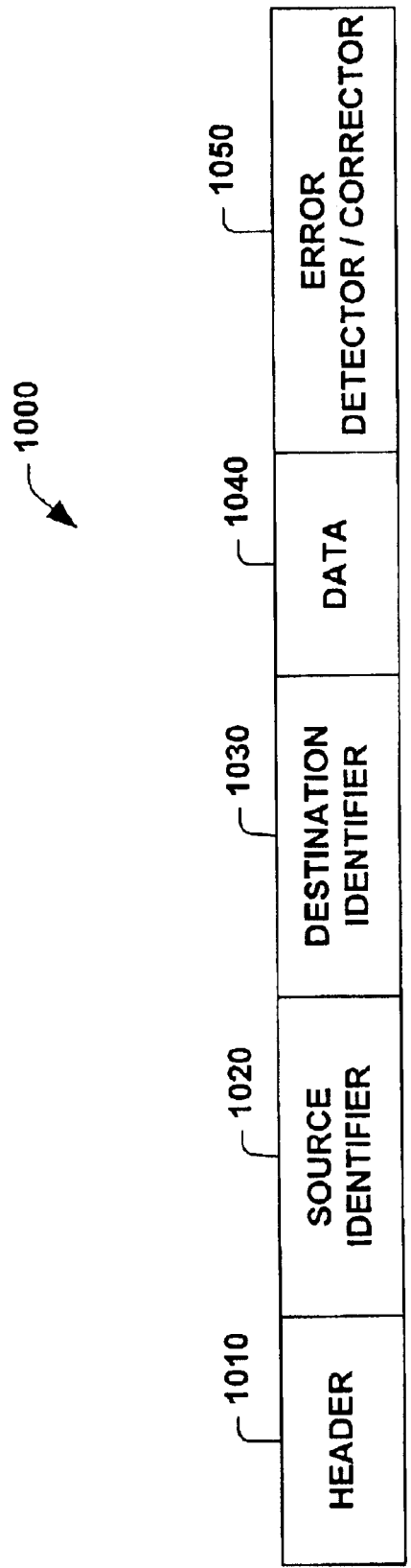
FIG. 10 illustrates an example data packet associated with intelligently parameterizing and/or configuring a file.

Referring now to FIG. 10, information can be transmitted between various computer components associated with intelligently parameterizing and configuring a file as described herein via a data packet 1000. An exemplary data packet 1000 is shown. The data packet 1000 includes a header field 1010 that includes information such as the length and type of packet. A source identifier 1020 follows the header field 1010 and includes, for example, an address of the computer component from which the packet 1000 originated. Following the source identifier 1020, the packet 1000 includes a destination identifier 1030 that holds, for example, an address of the computer component to which the packet 1000 is ultimately destined. Source and destination identifiers can be, for example, globally unique identifiers (guids), uniform resource locators (URLs), path names, and the like. The data field 1040 in the packet 1000 includes various information intended for the receiving computer component. The data packet 1000 ends with an error detecting and/or correcting 1050 field whereby a computer component can determine if it has properly received the packet 1000. While six fields in one particular order are illustrated in the data packet 1000, it is to be appreciated that a greater and/or lesser number of fields arranged in varying orders can be present in data packets.

Figure 11:
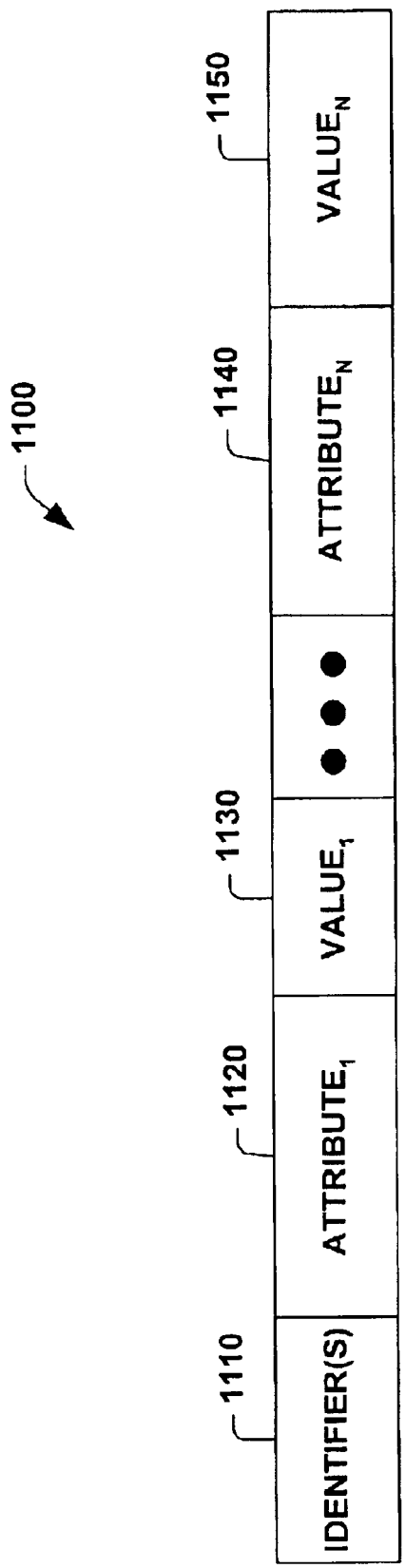
FIG. 11 illustrates example data packet sub-fields associated with intelligently parameterizing and/or configuring a file.

FIG. 11 is a schematic illustration of sub-fields 1100 within the data field 1050 (FIG. 10). The sub-fields 1100 discussed are merely exemplary and it is to be appreciated that a greater and/or lesser number of sub-fields could be employed with various types of data germane to intelligently parameterizing and configuring a file. The sub-fields 1100 include a field 1110 that includes, for example, information concerning identifying a parameter (e.g., name, uuid). The sub-fields 1100 may also include a field 1120 that stores, for example, an attribute (e.g., range, suggested value) of a parameterized item. Thus, the sub-fields 1100 may also include a field 1130 that stores, for example, a value for the attribute field 1120. Similarly, the sub-fields 1100 may include a field 1140 that stores, for example, another attribute of a parameterized item and a field 1150 that stores a value for the attribute field 1140. While two attribute/value pairs are illustrated, it is to be appreciated that the sub-fields 1100 could contain a greater and/or lesser number of such attribute/value pairs.

Referring now to FIG. 12, an API 1200 is illustrated providing access to a system 1230 for intelligently parameterizing files and configuring the parameterized items in a parameterized file. The API 1200 can be employed, for example, by programmers 1210 and/or processes 1220 to gain access to processing performed by the system 1230. For example, a programmer 1210 can write a program to access a parameterizing and configuring tool 1230 (e.g., to invoke its operation, to monitor its operation, to access its functionality) where writing a program is facilitated by the presence of the API 1200. Thus, rather than the programmer 1210 having to understand the internals of the parameterizing and configuring tool 1230, the programmer's task is simplified by merely having to learn the interface to the parameterizing and configuring tool 1230. This facilitates encapsulating the functionality of the parameterizing and configuring tool 1230 while exposing that functionality.

Similarly, the API 1200 can be employed to provide data values to the system 1230 and/or retrieve data values from the system 1230. For example, a process 1220 that retrieves parameterizing information can provide parameterizing information to the parameterizing and configuring tool 1230 and/or a programmer 1210 via the API 1200 by, for example, using a call provided in the API 1200. Thus, in one example of the API 1200, a set of application program interfaces can be stored on a computer-readable medium. The interfaces can be executed by a computer component to gain access to a parameterizing and configuring tool 1230. The interfaces can include, but are not limited to, a first interface 1240 that receives parameterizing information associated with parameterizing an item, a second interface 1250 that receives configuration information associated with configuring a parameterized item, and a third interface 1260 that receives merge information associated with applying configuration information to a parameterized item.

The systems, methods, and objects described herein may be stored, for example, on a computer readable media. Media can include, but are not limited to, an ASIC, a CD, a DVD, a RAM, a ROM, a PROM, a disk, a carrier wave, a memory stick, and the like. Thus, an example computer readable medium can store computer executable instructions for method for intelligently parameterizing and configuring a file. The method can include receiving an original, non-parameterized file, wrapping a portion of the original, non-parameterized file in XML to produce a basic file, and identifying portions of the basic file to be parameterized. The method can also include creating a parameter associated with the identified portion and storing the parameter in the intelligently parameterized file. Once the parameter has been identified, created, and/or stored, the method can also include adding the intelligence to the parameter, which includes creating parameter characteristics associated with the parameter and storing the parameter characteristics in the intelligently parameterized file. With the intelligently parameterized file created, intelligent configuration can occur, which can include, establishing values for the parameters in the intelligently parameterized file to produce a value file, and merging the non-parameterized file, the basic file, the intelligently parameterized file, and/or the value file to produce an intelligently configured file.

Similarly, a computer readable medium can store computer executable components of a system for intelligently parameterizing and configuring a file. The system can include a parameterizing tool that accepts an original file and/or a previously parameterized file, and produces an intelligently parameterized file. The system can also include a configuration tool that accepts an intelligently parameterized file, and/or a previously processed value file, and produces a value file. The system can also include a merge tool that accepts an intelligently parameterized file, a value file, and/or an original file, and produces an intelligently configured file by merging configuration choices back into parameterized items.

What has been described above includes several examples. It is, of course, not possible to describe every conceivable combination of components or methodologies for purposes of describing the systems, methods, computer readable media and so on employed in intelligently parameterizing and configuring a file. However, one of ordinary skill in the art may recognize that further combinations and permutations are possible. Accordingly, this application is intended to embrace alterations, modifications, and variations that fall within the scope of the appended claims. Furthermore, to the extent that the term "includes" is employed in the detailed description or the claims, it is intended to be inclusive in a manner similar to the term "comprising" as that term is interpreted when employed as a transitional word in a claim.

What is claimed is:

1. A system for intelligently parameterizing and configuring a file, comprising:
   a parameterizing tool that accepts one or more of, an original file, and a previously parameterized file, and produces an intelligently parameterized file;
   a configuration tool that accepts one or more of, an intelligently parameterized file, and a previously processed value file, and produces a value file; and
   a merge tool that accepts one or more of, an intelligently parameterized file, a value file, a basic file, and an original file, and produces an intelligently configured file.

2. The system of claim 1, where the parameterizing tool can intelligently parameterize one or more of a variable, a constant, a statement, a code section, text, data, and a definition.

3. The system of claim 1, the intelligently parameterized file comprising:
   a parameterized item; and
   one or more parameter characteristics related to the parameterized item, where the parameter characteristics facilitate making informed configuration choices concerning the parameterized item.

4. The system of claim 3, where the parameter characteristics include one or more of a maximum value, a minimum value, a range, a type, a limit, a rule for establishing an acceptable value, a guideline for establishing an acceptable value, a recommended value, a universally unique identifier (uuid), a related parameter identifier, and a conditional expression that controls whether the parameterized item can be configured.

5. The system of claim 1, where the intelligently parameterized file is an XML file.

6. The system of claim 5, the intelligently parameterized file comprising:
   one or more identifiers for identifying one or more parameterized items;
   one or more XML wrapped items from the original file;
   one or more parameterized items; and
   one or more parameter characteristics related to the one or more parameterized items, where the parameter characteristics facilitate making informed configuration choices concerning the one or more parameterized items.

7. The system of claim 6, where the parameter characteristics include one or more of a maximum value, a minimum value, a range, a limit, a rule for establishing an acceptable value, a guideline for establishing an acceptable value, a recommended value, a universally unique identifier (uuid), a related parameter identifier, and a conditional expression that controls whether a parameterized item can be configured.

8. The system of claim 7, where the parameter characteristics are stored in one or more XML attributes and/or elements.

9. The system of claim 1, where the value file is an XML file.

10. The system of claim 9, the value file comprising:
    one or more XML attributes and/or elements that store configuration values for one or more parameterized items.

11. A computer readable medium storing computer executable components of the system of claim 1.

12. A method for intelligently parameterizing and configuring a file, comprising:
    receiving an original, non-parameterized file;
    wrapping a portion of the original, non-parameterized file to produce a basic file;
    identifying an identified item in the basic file to be parameterized;
    creating a parameter associated with the identified item;
    storing the parameter in an intelligently parameterized file;
    associating one or more parameter characteristics with the parameter;
    storing the one or more parameter characteristics in the intelligently parameterized file;
    establishing in a value file one or more values for one or more of the parameters in the intelligently parameterized file; and
    merging one or more of, the non-parameterized file, the basic file, the intelligently parameterized file, and the value file to produce an intelligently configured file.

13. The method of claim 12, where wrapping one or more portions of the original, non-parameterized file comprises:
    creating one or more first XML elements and/or attributes for storing file identifying information;
    storing identifying information in the one or more first XML elements and/or attributes where the identifying information identifies the original, non-parameterized file;
    creating one or more second XML elements and/or attributes for storing the one or more portions of the original, non-parameterized file; and
    storing the one or more portions of the original, non-parameterized file in the one or more second XML elements and/or attributes.

14. The method of claim 12, where creating a parameter associated with the identified item comprises:
    establishing a name for a parameter;
    selecting one or more parameter characteristics for the parameter;
    selecting one or more configuration options for the parameter; and
    updating XML code in the intelligently parameterized file to store the name, the parameter characteristics, and the configuration options.

15. The method of claim 12, where establishing in a value file a value for a parameter in the intelligently parameterized file comprises:
    selectively presenting a configuration choice for the parameter;

selectively presenting one or more parameter characteristics for the parameter;

accepting a value for the parameter;

validating the value to establish a validated value; and selectively updating XML code in the value file to store the validated value.

16. The method of claim 12, where merging one or more of, a non-parameterized file, a basic file, an intelligently parameterized file, and a value file to produce an intelligently configured file comprises:

if there is an external file reference to resolve, resolving the external file reference;

if there is a related parameter to be resolved, resolving the related parameter;

if there is a conditional to evaluate, evaluating the conditional;

replacing a parameterized item with a value from the value file; and producing an intelligently configured file.

17. A computer readable medium storing computer executable instructions operable to perform the method of claim 12.

18. A system for creating an intelligently parameterized and configured file, comprising:

means for identifying an item to parameterize;

means for creating a parameterized item for the identified item;

means for associating parameter information with the parameterized item;

means for storing the parameter information in an XML parameterized file;

means for storing the parameterized item in the XML parameterized file;

means for establishing a value for the parameterized item;

means for storing the value for the parameterized item in the value file; and means for merging the value file with a file to produce an intelligently configured file.

19. A set of application programming interfaces embodied on a computer readable medium for execution by a computer component in conjunction with parameterizing and configuring a file, comprising:

a first interface for communicating parameterizing information to facilitate parameterizing a basic file into a parameterized file;

a second interface for communicating configuring information to facilitate configuring the parameterized file into a value file; and a third interface for communicating merge information to facilitate merging the value file and the parameterized file into a merged file.

20. In a computer system having a graphical user interface comprising a display and a selection device, a method of providing and selecting from a set of data entries on the display, the method comprising:

retrieving a set of data entries, each of the data entries representing one of a set of parameterization choices for a portion of a file;

displaying the set of entries on the display;

receiving a data entry selection signal indicative of the selection device selecting a selected data entry; and in response to the data entry selection signal, initiating an operation associated with the selected data entry.

21. In a computer system having a graphical user interface comprising a display and a selection device, a method of providing and selecting from a set of data entries on the display, the method comprising:

retrieving a set of data entries, each of the data entries representing one of a set of configuration choices for a parameterized portion of a file;

displaying the set of entries on the display;

receiving a data entry selection signal indicative of the selection device selecting a selected data entry; and in response to the data entry selection signal, initiating an operation associated with the selected data entry.

22. A computer data signal embodied in a transmission medium, comprising:

a code segment including instructions for receiving a non-parameterized file and storing one or more parameters in a parameterized a file;

a code segment including instructions for receiving a parameterized file and establishing one or more values for one or more parameters in a value file; and a code segment including instructions for receiving a parameterized file and a value file and merging the parameterized file and the value file to produce a configured file.

23. A data packet for transmitting parameterizing data to a computer component, comprising:

a first field that stores data representing a parameter identifier;

a second field that stores data representing one or more parameterizing attributes associated with a parameter identified by the parameter identifier; and a third field that stores data representing one or more values associated with the parameter identified by the parameter identifier.

24. A computer readable medium having stored thereon a data structure, comprising:

a first field that stores data representing a parameter identifier;

a second field that stores data representing one or more parameterizing attributes associated with a parameter identified by the parameter identifier; and a third field that stores data representing one or more values associated with the parameter identified by the parameter identifier.

* * * * *